United States Patent
Chopra et al.

(10) Patent No.: US 7,012,736 B1
(45) Date of Patent: Mar. 14, 2006

(54) BICHROMAL AND MULTICOLORED BALLS

(75) Inventors: Naveen Chopra, Oakville (CA); Daniel A. Foucher, Toronto (CA); Peter M. Kazmaier, Mississauga (CA); John R. Andrews, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 15 days.

(21) Appl. No.: 10/922,665

(22) Filed: Aug. 20, 2004

(51) Int. Cl.
*G02B 26/00* (2006.01)
*G09G 3/34* (2006.01)

(52) U.S. Cl. ..................... 359/296; 345/107
(58) Field of Classification Search ............... 359/252, 359/253, 296, 452; 345/105, 107, 108; 428/411.1; 427/213.32
See application file for complete search history.

(56) References Cited

U.S. PATENT DOCUMENTS

| | | | |
|---|---|---|---|
| 4,126,854 A | 11/1978 | Sheridon | |
| 5,262,098 A | 11/1993 | Crowley et al. | |
| 5,344,594 A | 9/1994 | Sheridon | |
| 5,604,027 A | 2/1997 | Sheridon | |
| 5,708,525 A | 1/1998 | Sheridon | |
| 5,717,514 A | 2/1998 | Sheridon | |
| 5,739,801 A | 4/1998 | Sheridon | |
| 5,754,332 A | 5/1998 | Crowley | |
| 5,815,306 A | 9/1998 | Sheridon et al. | |
| 5,825,529 A | 10/1998 | Crowley | |
| 5,900,192 A | 5/1999 | Richley | |
| 5,976,428 A | 11/1999 | Richley | |
| 5,989,629 A | 11/1999 | Sacripante et al. | |
| 6,054,071 A | 4/2000 | Mikkelsen, Jr. | |
| 6,235,395 B1 | 5/2001 | Sacripante et al. | |
| 6,419,982 B1 | 7/2002 | Sacripante et al. | |
| 6,445,490 B1 | 9/2002 | Chopra et al. | |
| 6,703,074 B1 | 3/2004 | Sacripante et al. | |
| 2002/0094377 A1* | 7/2002 | Sacripante et al. | 427/222 |

\* cited by examiner

*Primary Examiner*—Ricky L. Mack
*Assistant Examiner*—William Choi
(74) *Attorney, Agent, or Firm*—Eugene O. Palazzo and Fay, Sharpe, Fagan, Minnich & McKee, LLP

(57) ABSTRACT

Various techniques are disclosed for forming bichromal balls or multicolored balls by laser-based methods. In one method, a laser and a template are used to form small discrete precursors that are subsequently spherodized. In another method a laser is used to cut or otherwise form small discrete precursors that are also subsequently spherodized. These methods are particularly well suited for forming balls or other sphere-like bodies having diameters less than 100 microns.

23 Claims, 2 Drawing Sheets

BICHROMAL AND MULTICOLORED BALLS

BACKGROUND

The present disclosure relates, in various exemplary embodiments, to bichromal or multicolored balls and their formation by laser ablation. The disclosure finds particular application in conjunction with producing bichromal balls that can be used in displays and "electric paper" applications, and will be described with particular reference thereto. However, it is to be appreciated that the disclosure is also amenable to other like applications.

Bichromal balls or beads as sometimes referred to in the art, are small spherical balls which have an optical and an electrical anisotropy. These characteristics generally result from each hemisphere surface having a different color and electrical charge.

These spherical particles are imbedded in a solid substrate and a slight space between each ball. The substrate is then filled with a liquid (such as an oil) so that the balls are free to rotate in a changing electrical field, but can not migrate from one location to another. If one hemisphere is black and the other is white, each pixel can be turned on and off by the electrical field applied to that location by software, etc. Each pixel can be individually addressed, and a full page image can thus be generated.

Numerous patents describe bichromal balls, their manufacture, incorporation in display systems or substrates, and related uses and applications. Exemplary patents include, but are not limited to: U.S. Pat. Nos. 5,262,098; 5,344,594; 5,604,027 reissued as Re 37,085; U.S. Pat. Nos. 5,708,525; 5,717,514; 5,739,801; 5,754,332; 5,815,306; 5,900,192; 5,976,428; 6,054,071; 5,989,629; 6,235,395; 6,419,982; 6,235,395; 6,419,982; 6,445,490; and 6,703,074; all of which are hereby incorporated by reference. In addition, disclosure is provided by U.S. Pat. Nos. 4,126,854; and 5,825,529; and N. K. Sheridon et al., "The Gyricon—A twisting ball display", Proc. SID, Boston, Mass., 289, 1977; T. Pham et al., "Electro-optical characteristics of the Gyricon display", SID '02 Digest, 199, 2002; all of which are hereby incorporated by reference.

A typical process for making bichromal balls or Gyricon spheres is the spinning disk method. Black and white heated waxes are deposited onto a spinning disk, and centrifugal forces drive the wax to the perimeter of the disk. At the disk edge, the waxes sputter off into tiny droplets that solidify into beads or small spheres after being spun off the disk. Controlling the size distribution and bichromality of the resultant bichromal balls is a significant issue with this technique.

Accordingly, there is a need for a technique for forming bichromal balls which avoids, or at least significantly reduces, the problems associated with currently known manufacturing processes. Furthermore, there is a need for a method of producing bichromal balls having a relatively small size such as, less than 100 microns.

BRIEF DESCRIPTION

In accordance with one aspect of the present disclosure, a process for forming bichromal or multicolored balls or beads is provided. The process comprises providing a bilayer including (i) a first layer of a polymer material, such as a wax, having a first color, and (ii) a second layer of a polymer material, such as a wax, having a second color different than the first color. The process also comprises a step of providing a laser capable of ablating the polymer material in the bilayer. The process further comprises operating the laser and directing light emitted therefrom upon the bilayer to ablate material from the bilayer and form a plurality of precursor particles from the bilayer. Optionally, a template can be utilized to assist in the ablation process. Each particle so formed has a first region of the first color and a second region of the second color. The process additionally comprises a step of heating the plurality of precursor particles to thereby form bichromal balls or beads. Also included in this disclosure are the bichromal balls or beads produced by this process.

In accordance with another aspect of the present disclosure, a process for forming bichromal balls is provided in which the process comprises a step of providing a layered array of at least two layers. Each layer comprises a wax material and has a color different than the other layer(s). The process also comprises a step of ablating regions of the layered array in a predetermined pattern to form a plurality of precursor particles from the layered array. Each of the precursor particles contains at least two regions, each region comprising a wax material and having a color different than the other region(s). The process further comprises a step of removing the plurality of precursor particles from the ablated layered array. The process additionally comprises a step of heating the plurality of precursor particles to a temperature sufficient to cause melting of the wax material in each region of the precursor particles, whereby the precursor particles are spherodized to form bichromal balls or beads upon cooling.

In accordance with yet another aspect of the present exemplary embodiment, a process for forming multicolored balls is provided in which the process comprises forming a body having a plurality of distinct regions, each region constituting a wax material exhibiting a color different than the other regions. The process also comprises a step of laser ablating the body into a plurality of discrete particles. Each particle includes the plurality of distinct regions. The process further comprises a step of heating the plurality of discrete particles to thereby form a plurality of multicolored balls. This embodiment also includes the multicolored balls formed by this process.

These and other non-limiting aspects and/or objects of the development are more particularly disclosed below.

BRIEF DESCRIPTION OF THE DRAWINGS

The following is a brief description of the drawings, which are presented for the purposes of illustrating one or more of the exemplary embodiments disclosed herein and not for the purposes of limiting the same.

DETAILED DESCRIPTION

Figure 1:
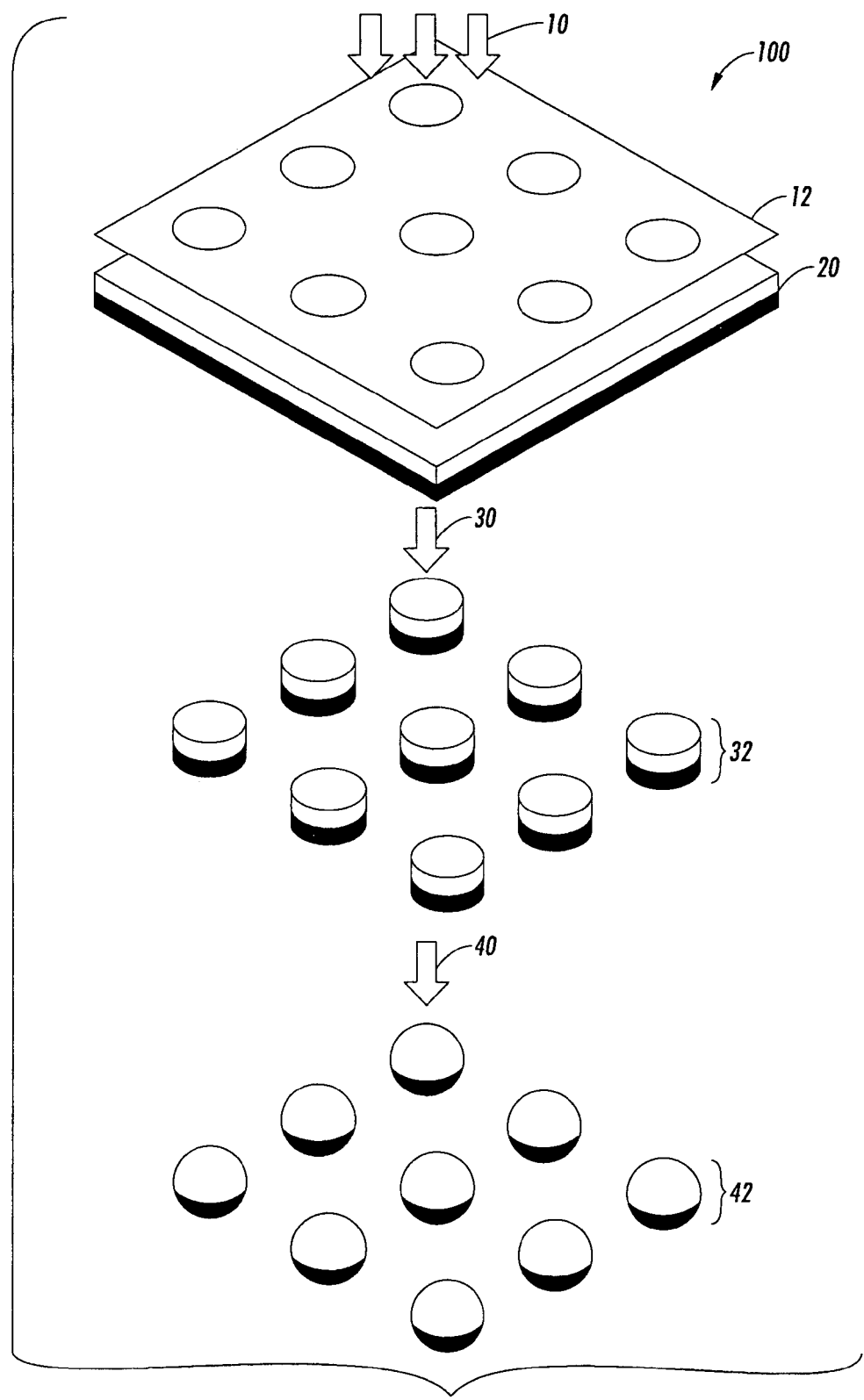
FIG. 1 is a schematic illustration of a method for forming bichromal balls in accordance with the present disclosure.

The present disclosure relates, in various exemplary embodiments, to processes and/or procedures for forming monodisperse, perfectly, or nearly so, bichromal or multicolored balls, or as sometimes referred to as Gyricon spheres. These balls or spheres are from about 5 to about 200 microns, including about 20 to about 110 microns, such as less than 100 microns in diameter. Two layers of different colored polymer materials, such as pigmented waxes, can be spin-coated on top of one another to create a bilayer of differently colored films. A UV, i.e. ultraviolet, laser is used to shape or cut out certain configured precursors, such as dowels, squares, rectangles, rhomboid or cylindrical shaped precursors. These configured precursors are then formed and removed from the sheet and spherodized to create bichromal particles. The laser source is typically an excimer laser such as KrF (operating at a wavelength from about 100 nm to about 500 nm including from about 248 nm wavelength). Also described herein is a method of making multicolored balls or particles using similar methods.

The term "wax" is utilized herein to refer to a low-melting organic mixture of compound of high molecular weight, solid at room temperature, and generally similar in composition to fats and oils except that it contains no glycerides. Some are hydrocarbons, others are esters of fatty acids and alcohols. They are classed among the lipids. Waxes are thermoplastic, but because they are not high polymers, they are not considered in the family of plastics. Common properties, are water repellency, smooth texture, low toxicity, freedom from objectionable odor and color. They are combustible and have good dielectric properties; soluble in most organic solvents, insoluble in water. The major types are as follows:

I. Natural
  1. Animal (beeswax, lanolin, shellac wax, Chinese insect wax)
  2. Vegetable (carnauba, candelilla, bayberry, sugar cane)
  3. Mineral
    (a) Fossil or earth waxes (ozocerite, ceresin, montan)
    (b) Petroleum waxes (paraffin, micro-crystalline) (slack or scale wax)
II. Synthetic
  1. Ethylenic polymers and polyol ether-esters ("Carboxwax," sorbitol)
  2. Chlorinated naphthalenes ("Halowax)"
  3. Hydrocarbon type, such as Nucrel™ (DuPont) and Elvax™ (DuPont).

Examples of such commercially available materials and their sources include polyethylene and polypropylene waxes and their modified derivatives. One example of a polyethylene wax is Polywax™ 1000, manufactured by the Baker-Petrolite Corporation. This material is a nearly crystalline polyethylene wax with a narrow molecular weight distribution, and, consequently, a narrow melt distribution. This material retains a low melt viscosity until just above the melting temperature, a desirable property for the spherodization of the particles. Other examples include lower molecular weight Polywax™ materials, such as Polywax™ 400, Polywax™ 500, Polywax™ 600, Polywax™ 655, Polywax™ 725, Polywax™ 850, as well as higher Mw Polywax™ materials such as Polywax™ 2000, and Polywax™ 3000. Other examples of commercially available polyethylene waxes include members of the Licowax™ product line, available from Clariant. Examples of such materials include: Licowax™ PA520 S, Licowax™ PE130, and Licowax™ PE520, as well as micronized polyethylene waxes such as Ceridust™ 230, Ceridust™ 3615, Ceridust™ 3620, and Ceridust™ 6071.

Examples of commercially available montan waxes include Licolub™ CaW 3, Licowax™ E, Licowax™ OP, all available from Clariant.

A commercially available synthetic form of carnauba wax is Petronauba™ C, available from Baker-Petrolite Corporation.

Examples of polypropylene waxes include Licomont™ AR504, Licowax™ PP230, Ceridust™ 6071, Ceridust™ 6072, Ceridust™ 6721 (Clariant).

Examples of modified polyethylene waxes include linear alcohol waxes such as:

Unilin alcohols including Unilin™ 350, Unilin™ 425, Unilin™ 550 and Unilin™ 700 (Baker-Petrolite Corporation);

linear carboxylic acid such as Unicid carboxylic acid polymers including Unicid™ 350, Unicid™ 425, Unicid™ 550, and Unicid™ 700 (Baker- Petrolite Corporation);

oxidized polymer materials such as Cardis™ 314, Cardis™ 36, Cardis™ 320 (Baker-Petrolite Corporation) and oxidized polyethylene waxes such as Petrolite™ C-8500, Petrolite™ C- 7500, Petrolite™ E-2020, Petrolite™ C-9500, Petrolite™ E-1040 (Baker- Petrolite Corporation).

Furthermore, in addition to waxes, different polymer materials, including other low polymers, can also be utilized herein so long as the desired properties and characteristics are produced thereby. Examples of such additional polymers include, but are not limited to, maleic anhydride-ethylene copolymers, maleic anhydride polypropylene copolymers, nylons, polyesters, polystyrene, poly(chloromethylstyrene), and acrylates such as polymethylmethacrylate.

Commercially available examples of maleic anhydride-ethylene copolymers include Ceramer™ polymers such as Ceramer™ 1608, Ceramer™ 1251, Ceramer™ 67, and Ceramer™ 5005 (Baker-Petrolite Corporation).

Commercially available examples of maleic functional polypropylene polymers include X-10036 and X-10016 (Baker-Petrolite Corporation).

Commercially available examples of propylene-ethylene copolymers include Petrolite™ copolymers such as Petrolite™ EP-700, Petrolite™ EP-1104, Petrolite™ EP-1100, Petrolite™ EP-1200 (Baker-Petrolite Corporation).

The polymer or wax materials can be colored through the addition of pigments, dyes, light reflective or light blocking particles, etc., as it is commonly known in the art. Moreover, when waxes are used, pigments aid in the ablation process by absorbing the energy from the UV excimer laser. Laser ablation of pure polyethylene wax films is not possible at this wavelength. Films made of polymers containing aromatic groups (i.e. polystyrene) can be ablated in the absence of pigments, due to the absorption of the laser UV radiation by the aromatic rings.

In this regard, a "pigment" is defined herein to include any substance, usually in the form of a dry powder, that imparts color to another substance or mixture. Most pigments are insoluble in organic solvents and water; exceptions are the natural organic pigments, such as chlorophyll, which are generally organosoluble. To qualify as a pigment, a material must have positive colorant value. This definition excludes whiting, barytes, clays, and talc.

Pigments may be classified as follows:

I. Inorganic
  (a) metallic oxides (iron, titanium, zinc, cobalt, chromium).
  (b) metal powder suspensions (gold, aluminum).
  (c) earth colors (siennas, ochers, umbers).
  (d) lead chromates.
  (e) carbon black.
II. Organic
  (a) animal (rhodopsin, melanin).
  (b) vegetable (chlorophyll, xantrophyll, indigo, flavone, carotene).

Some pigments (zinc oxide, carbon black) are also reinforcing agents, but the two terms are not synonymous; in the parlance of the paint and rubber industries these distinctions are not always observed.

"Dyes" include natural and synthetic dyes. A natural dye is an organic colorant obtained from an animal or plant source. Among the best-known are madder, cochineal, logwood, and indigo. The distinction between natural dyes and natural pigments is often arbitrary.

A synthetic dye is an organic colorant derived from coal-tar- and petroleum-based intermediates and applied by a variety of methods to impart bright, permanent colors to textile fibers. Some dyes, call "fugitive," are unstable to sunlight, heat, and acids or bases; others, called "fast," are not. Direct (or substantive) dyes can be used effectively without "assistants"; indirect dyes require either chemical reduction (vat type) or a third substance (mordant), usually a metal salt or tannic acid, to bind the dye to the fiber.

A "colorant" as used herein is any substance that imparts color to another material or mixture. Colorants are either dyes or pigments, and may either be (1) naturally present in a material, (2) admixed with it mechanically, or (3) applied to it in a solution.

There may be no generally accepted distinction between dyes and pigments. Some have proposed one on the basis of solubility, or of physical form and method of application. Most pigments, so called, are insoluble, inorganic powders, the coloring effect being a result of their dispersion in a solid or liquid medium. Most dyes, on the other hand, are soluble synthetic organic products which are chemically bound to and actually become part of the applied material. Organic dyes are usually brighter and more varied than pigments, but tend to be less stable to heat, sunlight, and chemical effects. The term colorant applies to black and white as well as to actual colors.

Examples of such colorants (i.e., pigments, dyes, etc.) and their commercial sources include, but are not limited to, magenta pigments such as 2,9-dimethyl-substituted quinacridone and anthraquinone dye, identified in the color index as CI 60710, CI Dispersed Red 15, a diazo dye identified in the color index as CI 26050, CI Solvent Red 19, and the like; cyan pigments including copper tetra-4-(octadecylsulfonamido) phthalocyanine, copper phthalocyanine pigment, listed in the color index as CI 74160, Pigment Blue, and Anthradanthrene Blue, identified in the color index as CI 69810, Special Blue X-2137, and the like; yellow pigments including diarylide yellow 3,3-dichlorobenzidine acetoacetanilides, a monoazo pigment identified in the color index as CI 12700, CI Solvent Yellow 16, a nitrophenyl amine sulfonamide identified in the color index as Foron Yellow SE/GLN, CI Dispersed Yellow 33, 2,5-dimethoxy acetoacetanilide, Permanent Yellow FGL, and the like. Other suitable colorants include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2GO (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich, Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco- Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF). Examples of black pigments include carbon black products from Cabot corporation, such as Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls 520, Black Pearls 490, Black Pearls 480, Black Pearls 470, Black Pearls 460, Black Pearls 450, Black Pearls 430, Black Pearls 420, Black Pearls 410, Black Pearls 280, Black Pearls 170, Black Pearls 160, Black Pearls 130, Black Pearls 120, Black Pearls L; Vulcan XC72, Vulcan PA90, Vulcan 9A32, Regal 660, Regal 400, Regal 330, Regal 350, Regal 250, Regal 991, Elftex pellets 115, Mogul L.

Carbon black products from Degussa-Huls such as FW1, Nipex 150, Printex 95, SB4, SB5, SB100, SB250, SB350, SB550; Carbon black products from Columbian such as Raven 5750; Carbon black products from Mitsubishi Chemical such as #25, #25B, #44, and MA-100-S can also be utilized.

Other black pigments that may also be used include Ferro™ 6330, a manganese ferrite pigment available from Ferro Corporation, and Paliotol Black 0080 (Aniline Black) available from BASF.

Furthermore, as briefly mentioned above, the addition of dyes and pigments can also increase laser coupling and therefore increase the cutting efficiency. Hence, selection of the wax material and/or the dye/pigment can be made to optimize the cutting and/or shaping process.

Moreover, one or more processing aid, such as surface active agents and dispersants aids like Aerosol™ OT-100 (from American Cynamid Co. of Wayne, N.J.) and aluminum octoate (Witco). Dispersant aids such as X-5175 (from Baker- Petrolite Corporation), Unithox™ 480 (from Baker-Petrolite Corp.), and Ceramer™ 5750 (Baker-Petrolite Corp.) can also be added to the waxy base material.

In one technique according to the present discovery, a layered array is formed as follows. Polywax 1000 available from Baker-Petrolite is compounded with titanium dioxide ($TiO_2$) to create a white wax. This wax is heated to a molten state and is spin coated or blade coated onto a substrate. A similar copolymer compounded with a black pigment, such as carbon black, is spin coated/blade coated onto the first layer. Each layer is about 10 microns to about 45 microns, and generally about 30 microns, in thickness.

Next, a laser etching, ablating, or cutting operation is performed. A UV photomask etched with nearly complete circles, squares, rectangles, rhomboids, etc., is placed over the top sheet. A DUV, i.e. deep ultraviolet, laser is allowed to "burn" holes through the apertures of the mask.

The laser ablation or cutting process could be accomplished with an excimer laser. In this process the preferred method would be to singulate a 2-d array of bilayer elements using an imaging process, as is known in the art, which defines the cut lines. As an alternate means to laser imaging, a scanned focused laser could be used to singulate bilayer elements. In this case, an array of lines could be cut along one axis and a second array of lines could be cut at right angles to the first lines, forming square or rectangular (or in general rhomboid) bilayer elements. The scanning laser could include, but is not be limited to, diode pumped solid state lasers (and harmonics), $CO_2$ lasers, copper vapor lasers, and noble gas ion lasers.

Alternative shaping or cutting processes such as embossing, mechanical punching, or stamping are also included within the scope of this disclosure. The shape or configuration of the precursor can vary. For example, it has been found that square or rectangular shaped precursors are in many instances more efficient from a material usage standpoint.

After shaping, gentle pressure is applied to the sheet, and the resulting dowels or precursor particles of bichromal materials are removed from the bilayer. The dowels or precursor particles are heated and spherodized to produce the bichromal beads.

The precursor particles can be spherodized in a flowing heated air or gas stream such as in a fluidized bed drying apparatus, which suspends the particles in a circulating hot air mass. The temperature used would depend on the polymer. For a low molecular weight styrene, for example, 150° C. can be the temperature to use. Alternatively, the precursor particles could be dispersed in a nonsolvent, i.e. a liquid that the particles do not dissolve in, with the optional aid of a surfactant, and heated to the softening point of the polymer, allowing the particles to spherodize. In another embodiment, the particles could be passed through an air or gas zone of high temperature to spherodize them, and dropped directly into a cold liquid bath to 'quench' the particles in their spherical state.

Alternative processes for transforming the dowels or precursor particles into spheres include spray coating the particles with a low-melt polymer or wax that is subsequently spherodized using the techniques mentioned above, to create a core-shell type spherical particle.

In yet another method in accordance with the present discovery, multi-colored balls are produced from a laser etching or cutting operation. A plurality, such as four different colored waxes are prepared in a manner similar to that described. Using two very fine heated nozzles of from about 10 to about 20 microns in diameter, two strips of wax are deposited in a line. Directly on top of these two strips are deposited two more strips of wax of different colors to create a square rod of wax composed of four differently colored quadrants.

The laser is used to cut the rod into small cubes. The cubes are then spherodized to create bichromal balls of four different colors.

This process can also be extended to create three colored balls or particles in which only one strip of colored wax is laid down on top of the two strips. Spherodizing is generally performed by heating, as described herein.

Laser ablation of a laminated two layer, i.e. two color, wax can be efficiently performed with an excimer laser operating an any convenient wavelength such as 248 nm or 308 nm depending on the absorption characteristics of the wax. Additives to the wax such as aromatic-containing polymers would activate the wax to ablation at 248 nm. Excimer laser ablation using area imaging that images circles onto the substrate could cut cylinders, or truncated cones from the wax. For spherical beads that are 30 microns in diameter, the cylinder would need to be 33 microns in diameter and 16.5 microns high. The thickness would be split nearly evenly between two colors. To adjust the size and to equalize the two colors, the true truncated cone shape would adjust the size and lead to a slightly unequal thickness. Such dimensions and aspect ratios fit easily within the capability of laser ablation processes. Based upon this, less than about 50% of the material could be converted into spheres. The size distribution would also be very narrow due to the precision of the ablation process. A spread of diameters of from about 5 to about 10% is a reasonable estimate.

Alternate processes for optical processing such as scanned cutouts could also be performed though they may be less efficient than image-wise ablation using an excimer laser.

It is believed that particles as small as 20 microns in diameter can be produced in accordance with the methods described herein. The limiting factors in making smaller balls are (1) the intermixing of pigmented waxes during the spherodization (which would destroy the bichromality of the spheres) and (2) the interparticle attraction due to static and Van der Waals attractive forces, which would cause particles to 'cluster together' during the spherodization step. It is believed that the laser ablation cutting step is not limited to 20 micron spheres. A size limit associated with the laser operating characteristics is believed to be about 5 microns.

FIG. 1 illustrates a first embodiment process 100 for forming the bichromal balls described herein. In this process, a bilayer of two wax-based materials illustrated as bilayer 20, is subjected to ultraviolet radiation 10, such as from a UV laser. The bilayer can be a two layer member including a first layer of a wax material having a first color, and a second layer of a wax material having a second color different than the first color. A template 12 is optionally used to form the desired lines of cutting. The template generally includes one or more apertures or open regions across its thickness that, upon exposure to ablating light or other radiation, form lines of cutting in the material undergoing ablation. The laser cuts, or rather ablates, the wax material along the desired lines of cutting. The cylindrically shaped precursor particles are separated from the uncut portion of the bilayer 20 in a separation step 30. Although the precursor particles are described as cylindrical, the process includes particles of any shape. A collection of bilayer cylindrical precursors 32 are then subjected to a heating operation shown as step 40. By appropriate selection of the heating temperatures and other parameters, a collection of bichromal balls 42 are produced. For a bilayer member having a first layer of a wax material and a second layer of another wax material, the precursor particle is heated to a temperature greater than the maximum melting temperature of the wax materials.

Figure 2:
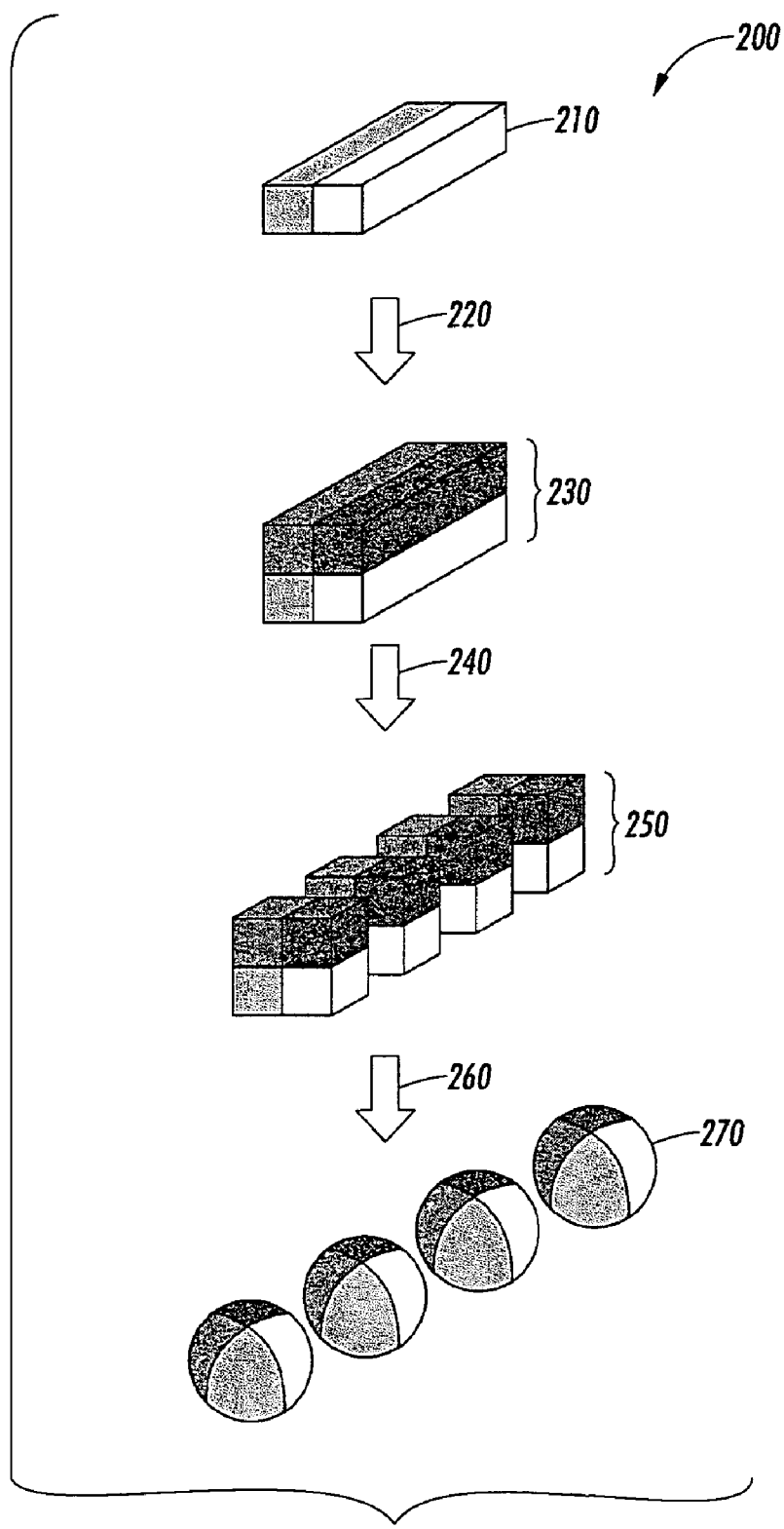
FIG. 2 is a schematic illustration of another method for forming bichromal balls in accordance with this disclosure.

FIG. 2 illustrates another preferred embodiment process 200. In this process, two strips of pigmented wax 210 are provided. Generally, each strip has a color different than the other strip. An additional one or more other differently colored layers of wax-based material are deposited thereon in step 220 to form a strip of material 230. A severing operation, preferably performed with an ablation laser is performed in step 240 to produce a plurality of block-shaped precursor particles 250. Next, the precursor particles are subjected to a spherodizing operation shown in the figure as step 260. This is preferably performed by subjecting the precursors 250 to a heating operation. The spherodized particles are then in the form of a four-colored ball shown as 270.

Although the present discovery has been described in terms of using a plurality of wax materials differing in color, the discovery includes selecting other types of materials that can differ in other aspects besides, or in addition to color.

The bichromal or multicolored balls produced by the process disclosed above can be used to form display elements. For example, the bichromal or multicolored balls can be cast in a transparent sheet material, covered and immersed in a dielectric fluid such as oil. The oil is then absorbed by the sheets forming oil filled pockets around each bichromal or multicolored ball.

Alternatively, the bichromal or multicolored balls can be encapsulated and incorporated into a substrate. The display elements so achieved can then be made to operate as conventionally known in the art of Gyricon displays, such as by bringing the display into association with an electronic field that causes the bichromal or multicolored balls within the Gyricon elements to appropriately rotate so as to display a desired image.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process for forming bichromal balls, said process comprising:
   providing a bilayer including (i) a first layer of a wax material having a first color, and (ii) a second layer of a wax material having a second color different than said first color;
   providing a laser capable of ablating said wax material in said bilayer;
   operating said laser and directing light emitted therefrom upon said bilayer to ablate said bilayer and form a plurality of precursor particles from said bilayer, each particle having a first region of said first color and a second region of said second color;
   heating said plurality of precursor particles to thereby form said bichromal balls.

2. The process of claim 1, further comprising:
   providing a template defining at least one aperture extending through said template; and
   prior to said step of operating said laser, positioning said template adjacent said bilayer such that said aperture constitutes a desired line of cutting upon ablation by said laser of said bilayer.

3. The process of claim 1, wherein said precursor particles are in the shape of cylinders, squares or rhomboids.

4. The process of claim 1, wherein said heating is performed such that said plurality of precursor particles are heated to a temperature greater than the softening temperature of the wax materials in said first layer and said second layer.

5. The process of claim 1, wherein each of said first layer and said second layer has a thickness of from about 10 microns to about 45 microns.

6. The process of claim 1, wherein said bichromal balls produced therefrom have a diameter of from about 20 microns to about 100 microns.

7. The process of claim 1, wherein said laser emits ultraviolet light.

8. The process of claim 1, wherein said heating is performed by a technique selected from the group consisting of (i) heating in a flowing gas stream and (ii) heating in a liquid nonsolvent.

9. The plurality of bichromal balls produced by the process of claim 1.

10. A process for forming multicolored balls, said process comprising:
    providing a layered array of at least two layers, each said layer comprising a wax material and having a color different than the other layer;
    ablating regions of said layered array in a predetermined pattern to form a plurality of precursor particles from said layered array, each said precursor particle containing at least two regions, each region comprising a wax material and having a color different than the other region;
    removing said plurality of precursor particles from said ablated layered array; and
    heating said plurality of precursor particles to a temperature sufficient to cause melting of said wax material in each region of said precursor particles;
    whereby said precursor particles are spherodized.

11. The process of claim 10, further comprising:
    providing a template defining at least one aperture;
    prior to said ablating step, positioning said template on said layered array.

12. The process of claim 10, wherein each of said first layer and said second layer has a thickness of from about 10 microns to about 45 microns.

13. The process of claim 10, wherein said multicolored balls produced therefrom have a diameter of from about 20 microns to about 100 microns.

14. The process of claim 10, wherein said ablating step is performed by an ultraviolet laser operating at a wavelength of from about 100 to about 500 nm.

15. The process of claim 10, wherein said heating is performed in a flowing gas stream or in a liquid nonsolvent.

16. The plurality of multicolored balls produced by the process of claim 10.

17. A process for forming multicolored balls, said process comprising:
    forming a body having a plurality of distinct regions, each region constituting a wax material exhibiting a color different than the color of the other regions;
    laser ablating said body into a plurality of discrete particles, each said particle having said plurality of distinct regions;
    heating said plurality of discrete particles to thereby form a plurality of multicolored balls.

18. The process of claim 17, wherein each said multicolored ball has said plurality of distinct regions.

19. The process of claim 17, wherein said discrete particles are in the shape of cubes.

20. The plurality of multicolored balls produced by the process of claim 17.

21. The process of claim 17, wherein the wax material further includes a pigment, a dye or a combination thereof.

22. The process of claim 17, wherein the laser ablation occurs by an excimer laser.

23. The process of claim 17, wherein the laser ablation occurs by a scanned focus laser.

* * * * *